No. 633,679. Patented Sept. 26, 1899.
E. M. BIRDSALL.
PNEUMATIC TIRE.
(Application filed Dec. 5, 1898.)
(No Model.)
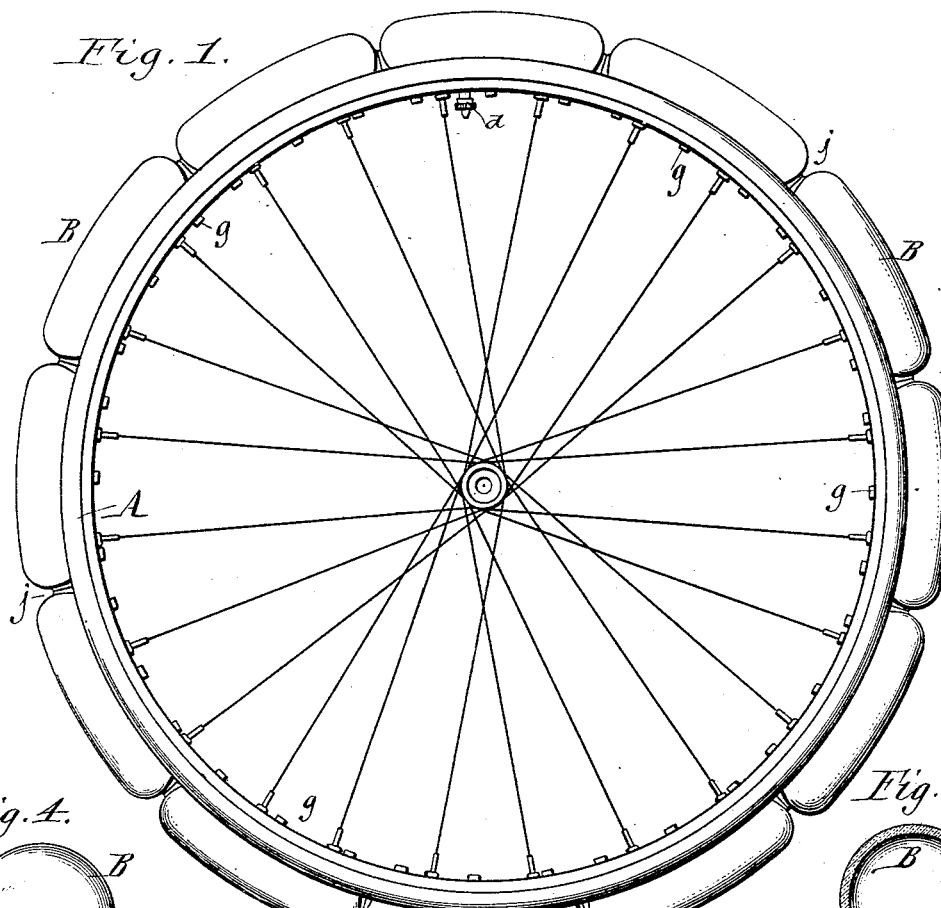
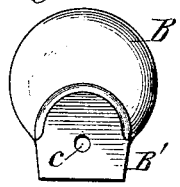
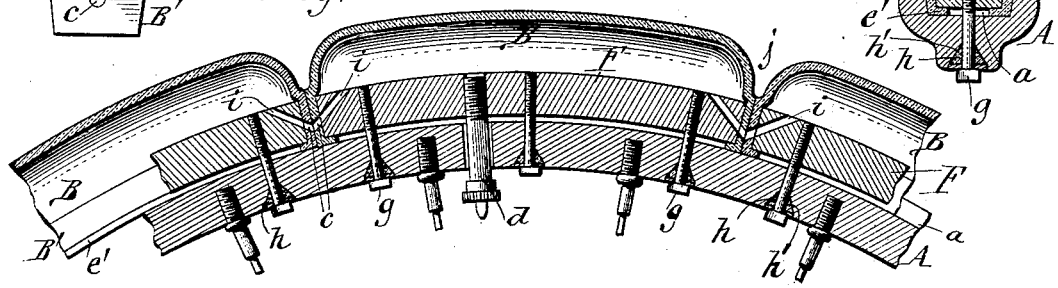
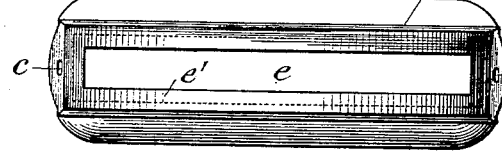
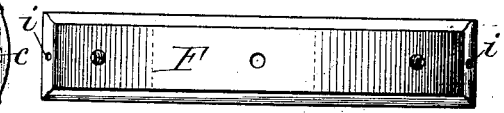

UNITED STATES PATENT OFFICE.

EDGAR M. BIRDSALL, OF BUFFALO, NEW YORK, ASSIGNOR TO MARY B. BIRDSALL, OF SAME PLACE, AND H. S. KELLET, OF AUBURN, NEW YORK.

PNEUMATIC TIRE.

SPECIFICATION forming part of Letters Patent No. 633,679, dated September 26, 1899.

Application filed December 5, 1898. Serial No. 698,316. (No model.)

*To all whom it may concern:*

Be it known that I, EDGAR M. BIRDSALL, a citizen of the United States, residing at Buffalo, in the county of Erie and State of New York, have invented new and useful Improvements in Pneumatic Tires, of which the following is a specification.

This invention relates to pneumatic tires which are composed of communicating inflatable sections or chambers arranged end to end around the rim of the wheel and forming a practically continuous tire.

The object of my invention is the construction of a tire of this kind in which the sections are reliably secured to the wheel-rim and tightly forced against each other at their adjoining ends to prevent all liability of leakage and in which any one or more of the sections can be readily detached for conveniently repairing the same in case of puncture or other damage or for substituting a new section for an unserviceable one.

In the accompanying drawings, Figure 1 is a side elevation of a velocipede-wheel provided with my improved tire. Fig. 2 is a fragmentary longitudinal section thereof on an enlarged scale. Fig. 3 is a cross-section of the same, taken through a clamping-bolt of one of the followers or clamping-blocks. Fig. 4 is an end view of one of the sections. Fig. 5 is an inner or bottom plan view of a section. Fig. 6 is a similar view of one of the followers or clamping-blocks.

Like letters of reference refer to like parts in the several figures.

A is the wheel-rim, which may be constructed of any suitable material, but which is preferably made of wood. The rim is provided in its face with a circumferential groove $a$, which is preferably flared outward slightly, as shown in Fig. 3.

B are the inflatable sections or separate chambers of the sectional tire, which are partially seated in the groove of the rim, so as to project outwardly beyond the same, and which are arranged closely together and extend throughout the circumference of the rim, so that they form a practically continuous tire. These sections are constructed of a suitable flexible or resilient material, preferably rubber, and are of such a length that they properly conform to the size of the wheel required.

The sections or chambers are elongated or bulb-like in form and are provided with a contracted base portion B', which conforms to the bottom and sides of the groove in the wheel-rim. The adjoining sections communicate by means of registering air-passages $c$, formed in the contiguous ends thereof, whereby all of the sections are inflated upon forcing air into any one of them through an ordinary valve-stem $d$. Each section or chamber is closed at its ends and on all sides, except on its inner or seating side, where it is provided with an oblong or longitudinal opening $e$, which is somewhat smaller than the dimensions of the base of the section, so as to leave an inwardly-extending marginal flange $e'$, which rests against the grooved face of the wheel-rim, as shown in Figs. 2, 3, and 5.

F represents clamping-blocks or followers, of wood or other suitable material, arranged within the sections or chambers B and overlapping or bearing against the flanges $e'$ of the sections, so as to confine the same between the blocks and the face of the rim. Each of these blocks or followers is drawn toward the rim by radial clamping bolts or screws $g$ passing through holes in the rim and entering screw-threaded openings formed in the block, as shown in Figs. 2 and 3, so that upon tightening these bolts the flange of the section is securely clamped against the face of the grooved wheel-rim, thereby effectually precluding leakage of air through the open inner side of the section. In order to form a more effectual air-seal, the groove of the wheel-rim is flared, as hereinbefore described, and the clamping-blocks are correspondingly tapered or wedge-shaped in cross-section, as shown in Fig. 3, so that the side walls of the section are compressed laterally between the block and the sides of the groove. The ends of the sections are preferably flat and beveled slightly, so that they recede toward the base of the sections, as shown in Fig. 2. By this construction the joints formed by the abutting ends of the sections converge toward the center of the wheel, and each section is wedged between the two adjacent sections upon being drawn to its seat on the wheel-rim, thus forcing the sections tightly together and producing air-tight joints at their ends.

In order to prevent leakage of air from the sections through the bolt-holes in the wheel-rim, conical washers or packings $h$, of rubber or other suitable material, are applied to said bolts between their heads and the rim, these washers being seated in conical sockets or enlargements $h'$, formed at the inner ends of the bolt-holes.

As shown in Fig. 2, the clamping-blocks F are provided in their ends with oblique air-passages $i$, which coincide with the passages $c$ in the ends of the sections and open into the sections for placing the various sections in communication with one another.

The flat end portions of the sections preferably do not extend across the full diameter of the sections, but only from the base to about the center of the sections, and they project slightly beyond the rounded outer portions of the sections, as shown in Figs. 1 and 2, so as to leave outwardly-flaring spaces $j$ between the ends of adjacent sections. While the sections are in contact with the ground, they are compressed, causing the same to be further elongated and bringing their ends more closely together. By constructing the ends of the sections as shown any dirt or other obstruction which may enter and be held in the spaces between the sections by their compression is allowed to fall out of the spaces as soon as the sections contract to their normal length by leaving the ground. The clamping-blocks F, which are necessarily larger than the openings in the base of the sections in order to overlap their retaining-flanges $e'$, are inserted in the sections through these openings, the elasticity of the sections permitting the opening to stretch sufficiently for this purpose. The blocks are curved concentrically with the wheel-rim and are made of such thickness as to leave an ample air-space in the sections.

In constructing the tire the followers or clamping-blocks are first inserted in the sections, and the sections are then assembled around the grooved wheel-rim, after which the clamping-screws $g$ are passed through the holes of the rim and engaged with the openings of the followers and tightened, whereby the sections, owing to the beveled surfaces of the same and the wheel-rim, are compressed both at their sides and ends and forced into such close relation with the rim and with each other as to effectually prevent any leakage of air when the tire is inflated.

My improved tire while possessing the resilience of an ordinary pneumatic tire can be repaired more conveniently and quickly than such a tire. In case of puncture or other damage to the tire it is only necessary to detach the particular section or sections which are damaged by removing the clamping-bolts $g$ and then either substitute a new section, which is comparatively inexpensive, or repair the injured section, the interior of which is easily accessible through the opening in its base after removing the clamping-block. The tire is restored to its original condition upon replacing the new or repaired section, and either of these repairs can be made in a short space of time and without the employment of skilled labor.

I claim as my invention—

1. The combination with a wheel-rim having a longitudinal groove in its face, of a sectional pneumatic tire having its sections seated end to end in the groove of the rim and each having an open inner side provided with an inwardly-extending marginal flange which bears against the bottom of the rim-groove, a clamping-block arranged in each section and bearing against the flange thereof, and tightening means for drawing said blocks into the rim-groove for clamping the flanges of the tire-sections against the bottom of the groove, substantially as set forth.

2. The combination with a wheel-rim having an outwardly-flaring groove, of a pneumatic tire composed of inflatable sections or chambers arranged end to end around said rim and having inwardly-tapering base portions seated in the groove of the rim, a wedge-shaped clamping-block or follower arranged within each section and bearing against the sides of its beveled base portion, and tightening means for drawing said blocks into said groove, substantially as set forth.

3. The combination with a wheel-rim, of a pneumatic tire composed of a series of inflatable sections or chambers arranged end to end around the face of the wheel-rim and each provided in its ends with air-passages which register with the passages of adjoining sections, and followers or clamping-blocks arranged within said sections and operating to clamp said sections against the wheel-rim and provided with air-passages which coincide with the air-passages of the sections and open into the latter, substantially as set forth.

4. An inflatable section for a sectional pneumatic tire having an open inner side provided with an inwardly-extending marginal flange adapted to be clamped against the face of a wheel-rim, substantially as set forth.

Witness this my hand this 12th day of November, 1898.

EDGAR M. BIRDSALL.

Witnesses:
JNO. J. BONNER,
ELLA R. DEAN.